(12) United States Patent
Wiederin et al.

(10) Patent No.: US 11,927,508 B1
(45) Date of Patent: Mar. 12, 2024

(54) SYSTEM AND METHOD FOR HANDLING SMALL SAMPLES WITH MULTIPLE VACUUM CONFIGURATIONS

(71) Applicant: Elemental Scientific, Inc., Omaha, NE (US)

(72) Inventors: Kevin Wiederin, Omaha, NE (US); Daniel R. Wiederin, Omaha, NE (US); Ean Kiddoo, Omaha, NE (US)

(73) Assignee: Elemental Scientific, Inc., Omaha, NE (US)

( * ) Notice: Subject to any disclaimer, the term of this patent is extended or adjusted under 35 U.S.C. 154(b) by 368 days.

(21) Appl. No.: 17/152,910

(22) Filed: Jan. 20, 2021

Related U.S. Application Data (60) Provisional application No. 62/963,862, filed on Jan. 21, 2020.

(51) Int. Cl.
  *G01N 21/73* (2006.01)
  *G01N 1/20* (2006.01)

(52) U.S. Cl.
  CPC .............. *G01N 1/20* (2013.01); *G01N 21/73* (2013.01); *G01N 2001/205* (2013.01)

(58) Field of Classification Search
  CPC ..... G01N 1/20; G01N 21/73; G01N 2001/205
  See application file for complete search history.

(56) References Cited

U.S. PATENT DOCUMENTS

| | | | | |
|---|---|---|---|---|
| 3,645,142 A | * | 2/1972 | Turpin | G01N 1/38 422/561 |
| 3,795,347 A | * | 3/1974 | Singer | G01N 1/14 137/392 |
| 3,880,011 A | * | 4/1975 | Johnson | G01N 1/14 73/864.35 |
| 3,901,084 A | * | 8/1975 | Brailsford | G01N 1/18 141/130 |
| 3,901,087 A | * | 8/1975 | Fabritius | G01N 1/14 73/864.35 |
| 3,929,413 A | * | 12/1975 | Young | G01N 35/08 73/864.35 |
| 4,022,059 A | * | 5/1977 | Schontzler | G01N 1/18 73/863.02 |
| 4,037,472 A | * | 7/1977 | Gates | G01N 1/14 73/864.35 |

(Continued)

*Primary Examiner* — David J Bolduc
(74) *Attorney, Agent, or Firm* — Kevin E. West; Advent, LLP (57) ABSTRACT

Systems and methods are described for transporting sample using a first vacuum configuration and subsequently isolating the sample at a valve prior to introduction to an analysis system, where a second vacuum configuration transports other fluids through the system. A system embodiment can include, but is not limited to, a valve system including a first valve in fluid communication with a sample reservoir and a second valve having at least a first vacuum configuration to fluidically couple a first vacuum line with the first valve and having a second vacuum configuration to fluidically couple a second vacuum line with the first valve; a sensor system configured to detect presence or absence of a fluid at the first valve; and a controller configured to control operation of the second valve to block access of the first vacuum line to the first valve upon detection of the fluid at the first valve.

18 Claims, 10 Drawing Sheets

(56) References Cited

U.S. PATENT DOCUMENTS

| | | | | |
|---|---|---|---|---|
| 4,077,263 A * | 3/1978 | Brailsford | G01N 1/14 | 73/864.35 |
| 4,083,252 A * | 4/1978 | Stookey | G01N 1/14 | 73/864.35 |
| 4,163,392 A * | 8/1979 | Fleenor | G01N 35/1095 | 73/864.35 |
| 4,418,581 A * | 12/1983 | Jones | G01N 1/14 | 73/864.34 |
| 5,197,340 A * | 3/1993 | Jones | B01L 3/567 | 422/938 |
| 5,396,812 A * | 3/1995 | Peterson | G01N 1/14 | 73/863.25 |
| 5,433,120 A * | 7/1995 | Boyd | G01N 1/2035 | 73/863.81 |
| 6,055,821 A * | 5/2000 | Song | F25B 43/046 | 62/195 |
| 6,453,759 B1 * | 9/2002 | Lebski | G01N 1/2035 | 73/863.02 |
| 6,516,677 B1 * | 2/2003 | Suter | G01N 35/1097 | 73/863.85 |
| 7,413,710 B2 * | 8/2008 | Lisec | B01L 3/0241 | 422/417 |
| 7,430,930 B2 * | 10/2008 | Zeller | G01F 3/08 | 73/864.34 |
| 7,726,212 B2 * | 6/2010 | Magnussen | B01L 3/0217 | 73/864.16 |
| 8,438,939 B1 * | 5/2013 | Wiederin | B01F 33/403 | 73/864.22 |
| 8,607,652 B2 * | 12/2013 | Bareiss | G01N 1/18 | 73/864.34 |
| 8,925,375 B1 * | 1/2015 | Wiederin | G01N 1/38 | 73/864.22 |
| 10,239,756 B1 * | 3/2019 | Wang | B01J 20/18 | |
| 10,384,841 B2 * | 8/2019 | Werbner | B65D 47/263 | |
| 10,502,664 B2 * | 12/2019 | Cardin | G01N 1/2226 | |
| 10,690,637 B2 * | 6/2020 | Yasunaga | G01N 30/24 | |
| 10,809,275 B2 * | 10/2020 | Hurwitz | C12M 1/34 | |
| 10,948,464 B2 * | 3/2021 | Fujioka | G01N 30/86 | |
| 11,499,895 B2 * | 11/2022 | Wiederin | H01J 49/40 | |
| 2004/0099282 A1 * | 5/2004 | Kambara | C23C 14/564 | 134/1.1 |
| 2005/0124059 A1 * | 6/2005 | Kureshy | G01N 35/1016 | 435/287.2 |
| 2008/0022786 A1 * | 1/2008 | Sann | G01N 1/2042 | 73/863.86 |
| 2009/0000403 A1 * | 1/2009 | Magnussen | B01L 3/0237 | 73/864.18 |
| 2010/0229979 A1 * | 9/2010 | Sim | G01N 1/2035 | 137/565.17 |
| 2014/0143470 A1 * | 5/2014 | Dobbs | G06F 13/4282 | 710/308 |
| 2016/0056028 A1 * | 2/2016 | Wiederin | F17D 3/01 | 137/806 |
| 2016/0305917 A1 * | 10/2016 | Diaz | G01N 30/06 | |
| 2018/0154349 A1 * | 6/2018 | Habbal | G01N 35/1011 | |
| 2018/0180639 A1 * | 6/2018 | Diaz | G01N 21/35 | |
| 2019/0002170 A1 * | 1/2019 | Werbner | B67B 1/102 | |
| 2019/0070601 A1 * | 3/2019 | Wiederin | G01N 21/73 | |
| 2019/0214242 A1 * | 7/2019 | Saetvet | B01F 35/717 | |
| 2019/0368980 A1 * | 12/2019 | Barmash | G01N 1/2035 | |
| 2020/0330976 A1 * | 10/2020 | Wikholm | B01L 3/0279 | |
| 2020/0355718 A1 * | 11/2020 | Diaz | G01N 30/02 | |
| 2021/0072121 A1 * | 3/2021 | Wiederin | G01N 35/1097 | |
| 2022/0252630 A1 * | 8/2022 | Diaz | G01N 35/1097 | |

* cited by examiner

SYSTEM AND METHOD FOR HANDLING SMALL SAMPLES WITH MULTIPLE VACUUM CONFIGURATIONS

CROSS-REFERENCE TO RELATED APPLICATIONS

The present application claims the benefit of 35 U.S.C. § 119(e) of U.S. Provisional Application Ser. No. 62/963,862, filed Jan. 21, 2020, and titled "SYSTEM AND METHOD FOR HANDLING SMALL SAMPLES WITH MULTIPLE VACUUM CONFIGURATIONS." U.S. Provisional Application Ser. No. 62/963,862 is herein incorporated by reference in its entirety.

BACKGROUND

Inductively Coupled Plasma (ICP) spectrometry is an analysis technique commonly used for the determination of trace element concentrations and isotope ratios in liquid samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample.

Sample introduction systems may be employed to introduce the liquid samples into the ICP spectrometry instrumentation (e.g., an Inductively Coupled Plasma Mass Spectrometer (ICP/ICP-MS), an Inductively Coupled Plasma Atomic Emission Spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. The aerosol is then sorted in a spray chamber to remove the larger aerosol particles. Upon leaving the spray chamber, the aerosol is introduced into the plasma by a plasma torch assembly of the ICP-MS or ICP-AES instruments for analysis.

SUMMARY

Systems and methods are described for transporting small volumes of sample using a first vacuum configuration and subsequently isolating the sample at a valve prior to introduction to an analysis system, such as sample analysis via ICP-MS, where a second vacuum configuration is used to transport other fluids through the system (e.g., rinse fluids). A system embodiment can include, but is not limited to, a valve system including a first valve in fluid communication with a sample reservoir and a second valve having at least a first vacuum configuration to fluidically couple a first vacuum line with the first valve and a second vacuum configuration to fluidically couple a second vacuum line with the first valve; a sensor system configured to detect presence or absence of a fluid at the first valve; and a controller configured to control operation of the second valve to block access of the first vacuum line to the first valve upon detection of the fluid at the first valve to isolate the fluid within the sample reservoir.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures.

DETAILED DESCRIPTION

Overview

Sample introduction systems can be employed to introduce liquid samples to analytic instrumentation, such as inductively coupled plasma (ICP) spectrometry instrumentation, for analysis. For example, pump systems, valve systems, and autosampling systems can deliver a sample from a sample source (e.g., a sample vial) through one or more valves and into a nebulizer for subsequent chemical component analysis by the ICP spectrometry instrumentation. When multiple samples are handled by such sample introduction systems, the throughput of the systems can be limited by a number of factors, such as transfer rates of samples through the fluid lines of the system, transfer rates of other fluids (e.g., rinse fluids, working fluids, diluents, standards, chemical spikes or additives, eluents, etc.)

through fluid lines of the system, the ability of the system to recognize which sample has been drawn into the system through the autosampling system, the ability of the system to track which sample is introduced to the ICP spectrometry instrumentation, and the like. For example, biological samples can be provided for analysis in microtiter trays, where such trays can include hundreds of wells containing samples (e.g., 384 well microtiter plates or the like). Inefficiencies in sample handling or limitations in throughput of analyzing such samples are compounded through the process of handling each of the hundreds of samples, resulting in large potential time and monetary costs associated with processing the samples.

A valve injection system can be utilized to rapidly move an aliquot of a sample from a sample container and load it into a reservoir at a valve. The reservoir can be a length of tubing having a similar dimension or volume as the tube leading from the sample container to the valve. To speed sample loading, a pump system (e.g., a vacuum pump, syringe pump, etc.) can rapidly pull sample from the sample container (e.g., via a sample probe inside the sample container) and into the reservoir. However, such rapid loading of the sample presents challenges to high-throughput analyses of microvolume samples. For instance, the entire sample held in the sample container may be consumed during the rapid loading of the sample from the sample container into the reservoir or passed to the analysis instrumentation. If analysis results of the sample are questionable and the laboratory requires reanalysis of the sample to verify the results, consumption of the sample from the sample container would require a time-consuming re-preparation of the sample for verification analysis or an inability to reanalyze if no additional sample is present. In some situations, if the sample is loaded too rapidly or too strong of a vacuum is applied to the sample, the sample may include gas pockets between sample segments, which can lead to sample recognition problems with fluid sensors, inaccurate analysis of the sample, or the like.

Further, if the valve injection system only includes a weaker pump system to handle microvolume samples at a slower rate to avoid consuming the whole sample or segmenting the sample within the fluid line, then other aspects of the system may be negatively affected. For instance, the weaker pump system may lead to inefficient flow rates for rinsing fluid lines within the system between samples, reducing the overall sample throughput of the system. Moreover, such fluid handling systems can utilize basic timing considerations for when to move the autosampler probe into the next sample container or take up samples, where laboratory situations can negatively impact sample analysis under such timing considerations. For example, if a foreign body is introduced with a sample (e.g., a filter fiber, sediment, debris, etc.) or a foreign body interacts with the sample probe, the flow rate of fluids through the system can be slowed or otherwise altered, causing the timing to be negatively impacted (e.g., decreased uptake of sample, inaccurate analysis, etc.).

Accordingly, in one aspect, the present disclosure is directed to a system to isolate a precise amount of sample from a sample container under the influence of a first vacuum configuration to minimize sample consumption and allow enough sample remaining in the sample container to allow reanalysis if desired. The system includes a second vacuum configuration to move additional fluid through the system at a more rapid rate, such as to facilitate rinse protocols between different samples. For example, the system can include an injection valve in fluid communication with a vacuum source to draw sample into a sample reservoir at the injection valve. The system can include multiple vacuum configurations to facilitate transferring sample to the injection valve under a first vacuum configuration that provides a weaker vacuum than a second vacuum configuration used to transfer other fluids (e.g., rinse fluids) through the system. For example, the vacuum source can be fluidically coupled to the injection valve via a first vacuum line in the first vacuum configuration and can be fluidically coupled to the injection valve via a second vacuum line in the second vacuum configuration, where the first vacuum line has a smaller internal diameter than the second vacuum line to apply a weaker vacuum in the first vacuum configuration than in the second vacuum configuration. Alternatively or additionally, multiple vacuum sources can be fluidically coupled to the injection valve to provide varying vacuum strengths. The system includes one or more sensors to detect the presence or absence of sample at the valve where the output of the sensor(s) can be used to control operation of a second valve in fluid communication with the injection valve to control or cut off vacuum applied to the injection valve and alter the flow of sample from the sample container to the injection valve. For example, when the sensor or sensors detect presence of the sample at the injection valve, the second valve stops the flow of sample from the sample container to preserve the volume of sample fluid within the sample container (e.g., making the remaining sample in the container available for reanalysis or the like). Use of the sensor or sensors therefore accounts for actual sampling conditions within the system as opposed to relying solely on estimated timing or standard time protocols. Alternatively or additionally, the output of the sensor(s) can be used to control positioning or orientation of a sample probe used to obtain the sample, such as by causing the sample probe to be lifted from the sample container upon detection of the sample at the injection valve.

Example Implementations

Referring generally to FIGS. 1 through 4, systems 100 are shown for controlled introduction of a sample to a sample reservoir under a first vacuum configuration, isolating the sample at a valve prior to introduction to an analysis system, and drawing additional fluid through the valve under a second vacuum configuration. The system 100 shown in FIG. 1 includes a valve system (valves 102 and 104 are shown), a sample reservoir 106, a sensor system (sensors 108 and 110 are shown), a vacuum source 112, an autosampler unit 114, and a controller 116. The autosampler unit 114 introduces samples from a plurality of sample sources 118 through operation of the vacuum source 112 in fluid communication with the autosampler unit 114 via the valves 102 and 104. For example, the vacuum source 112 can include, but is not limited to, a syringe pump, a peristaltic pump, a diaphragm pump, a vacuum, or the like to draw fluid through the system 100. The autosampler unit 114 includes a sample probe 120 to move between individual sample sources of the plurality of sample sources 118 (e.g., according to pre-programmed sampling protocols) to introduce a plurality of samples to the valve 102 via a transfer line 122. The plurality of sample sources 118 can include, but is not limited to, sample containers having small sample volumes, such as microtiter wells, sample vials, or other containers (e.g., suitable for holding microvolume samples). The valve 102 directs sample, rinse fluid, or other fluids received from the autosampler unit 114 via the transfer line 122 into the sample reservoir 106. The valve 102 is configured to switch between valve orientations to provide fluid communication between the sample reservoir 106 and the valve 104 or between the sample reservoir 106 and an analysis instrument (e.g., ICP spectrometry instrumentation). For example, the valve 102 can include a multi-position valve (e.g., rotary valve) having six ports, seven ports, or another configuration of ports to facilitate selective fluid transfer.

Figure 1:
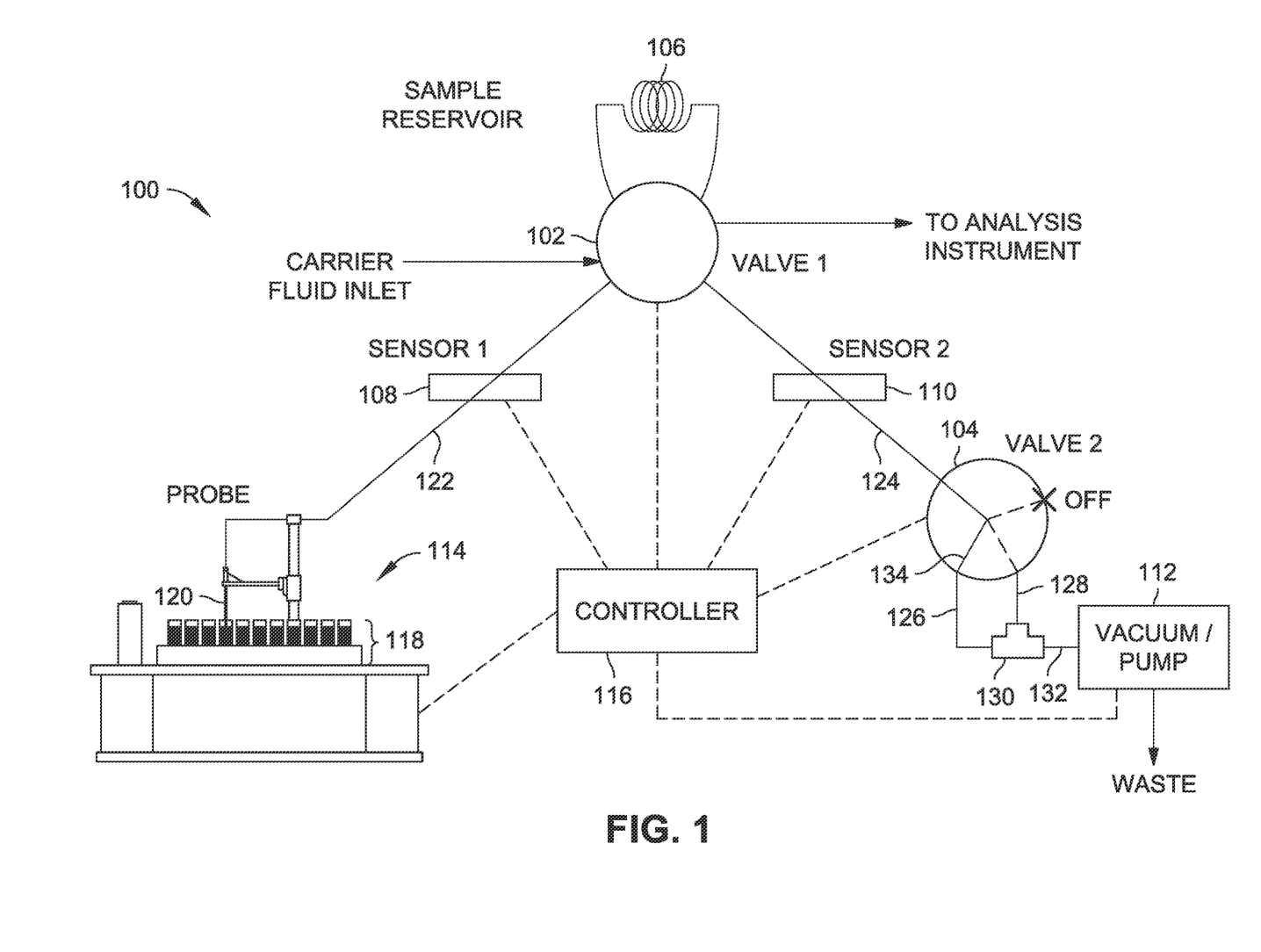
FIG. 1 is a diagrammatic illustration of a system for isolating a precise amount of sample from a sample container via a first vacuum configuration and for transferring other fluids through the second via a second vacuum configuration, in accordance with example implementations of the present disclosure.

The valve system is configured to switch between valve orientations to provide fluid communication between the vacuum source 112 and the valve 102. For example, the valve 104 can include a multi-position valve (e.g., rotary valve) having four ports, five ports, six ports, seven ports, or another configuration of ports to facilitate selective fluid transfer. In implementations, the vacuum source 112 is coupled with the valve 104 via a first vacuum line 126 and a second vacuum line 128. For example, the first vacuum line 126 and the second vacuum line 128 are each coupled to a fluid connector 130 (e.g., a T connector) which in turn is fluidically coupled to the vacuum source via vacuum line 132. The first vacuum line 126 and the second vacuum line 128 can have differing internal cross sections to provide differing vacuum conditions when the valve 104 fluidically couples the vacuum source 112 with the valve 102 via the respective lines. For example, the first vacuum line 126 can have an internal cross section that is smaller than an internal cross section of the second vacuum line 128. In implementations, the first vacuum line 126 can have an internal diameter that is smaller than an internal diameter of the second vacuum line 128 to provide a weaker vacuum when the valve 104 fluidically couples the vacuum source 112 with the valve 102 via the first vacuum line 126 than when the valve 104 fluidically couples the vacuum source 112 with the valve 102 via the second vacuum line 128. For instance, the second vacuum line 128 can have an internal diameter of about 1.6 mm and the first vacuum line 126 can have a smaller internal diameter (e.g., 0.5 mm, 0.25 mm, etc.). The vacuum line 132 can be of the same size as the second vacuum line 128 or larger so as to not interfere with the differing vacuum conditions provided via the first vacuum line 126 and the second vacuum line 128. For example, the vacuum line 132 can have an internal diameter of about 1.6 mm. The sizes of the vacuum lines can depend on the desired flow rate of fluids through the system 100 and are not necessarily limited to the example sizes provided herein.

Figure 2A:
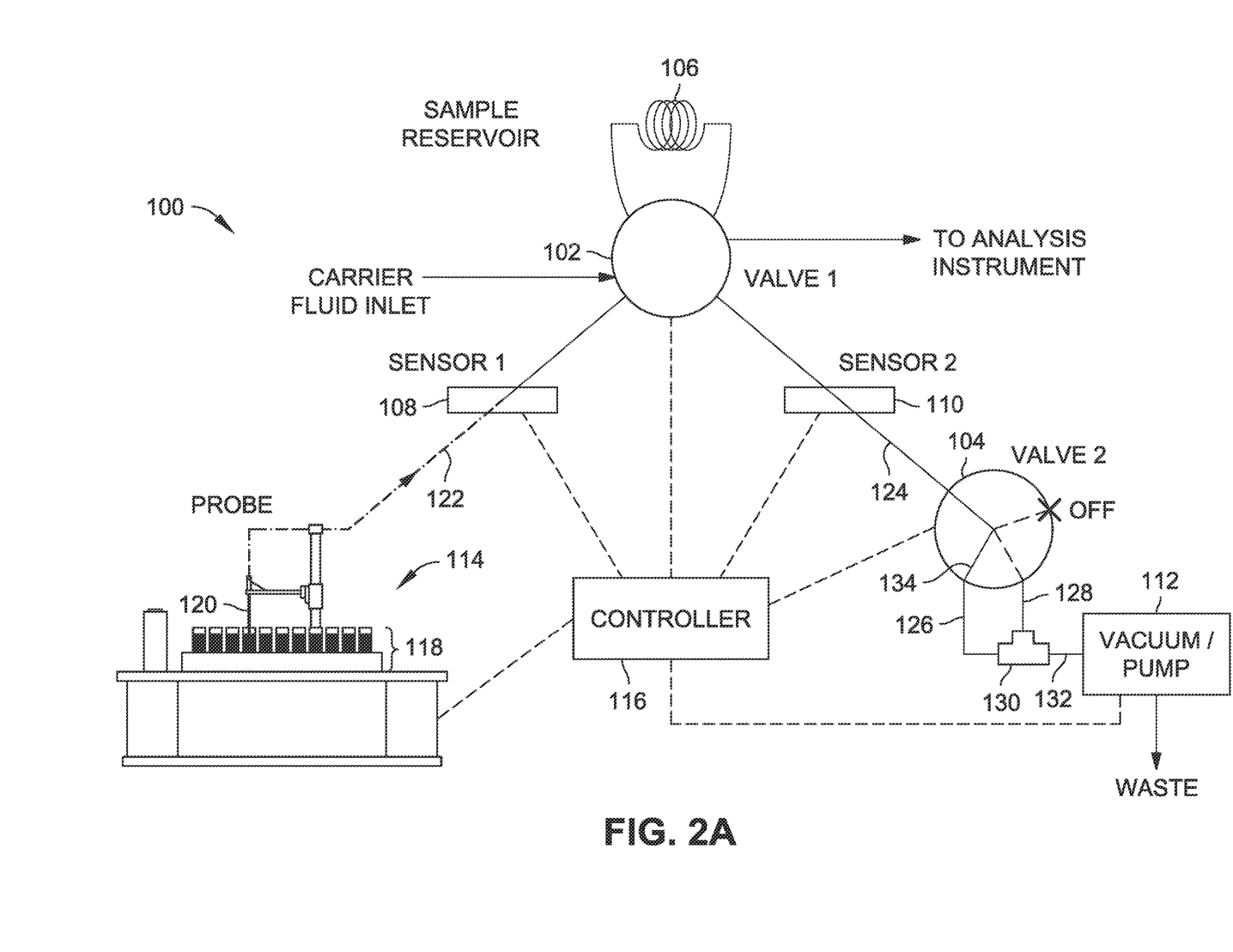
FIG. 2A is a diagrammatic illustration of the system of FIG. 1 beginning to draw sample for transfer to an injection valve through action of a vacuum in a first vacuum configuration.

The valve 104 is configured to couple the valve 102 with one of the vacuum lines to permit fluidic coupling between the vacuum source 112 and the valve 102 or with a blockage (e.g., blocked port or blocked line) to prevent fluid communication between the vacuum source 112 and the valve 102, based on the valve configuration of the valve 104. For example, in a first valve configuration, the valve 104 fluidically couples the first vacuum line 126 with the valve 102 (e.g., as shown in FIGS. 1, 2A, 2B, 3C) and prevents fluid communication between the valve 102 and the second vacuum line 128, in a second valve configuration, the valve 104 fluidically couples the second vacuum line 128 with the valve 102 (e.g., as shown in FIGS. 3A, 3E) and prevents fluid communication between the valve 102 and the first vacuum line 126, and in a third valve configuration, the valve 104 is in a blocked configuration (e.g., as shown in FIGS. 2C, 3B, 3D) and prevents fluid communication between the valve 102 and both of the first vacuum line 126 and the second vacuum line 128. In implementations, the valve 104 includes a selector channel 134 that couples one of the first vacuum line 126 (e.g., in the first valve configuration to provide the first vacuum configuration), the second vacuum line 128 (e.g., in the second valve configuration to provide the second vacuum configuration), or the blocked port/line with the valve 102 (e.g., in the third valve configuration).

The controller 116 is operably coupled to components of the system 100 to facilitate coordination of drawing samples, rinse fluid, or other fluids into the sample reservoir 106, stopping the drawing of samples, rinse fluid, or other fluids from the autosampler unit 114, and introducing fluid held in the sample reservoir 106 for injection into analytic instrumentation. For example, the controller 116 can control operation of one or more of the autosampler unit 114, the valve 102, the valve 104, the vacuum source 112, and analytic instrumentation based on signals received from one or more components of the system 100 including, but not limited to, one or more of the sensor 108, the sensor 110, and the analytic instrumentation.

An example sample transfer implementation of the system 100 is described with reference to FIGS. 2A through 2C. As shown in FIG. 2A, the vacuum source 112 is in fluid communication with the probe 120 of the autosampler unit 114 via the valve 104, the valve 102, and the sample reservoir 106. The valve 102 is in the first valve configuration to fluidically couple the vacuum source with the valve 102 via the first vacuum line 126 to provide a first vacuum configuration. Th probe 120 is introduced to a sample container 118 and the vacuum source 112 applies a vacuum to a fluid line 124 coupled between the valve 104 and the valve 102 to draw sample from the sample container 118 into the transfer line 122. The first vacuum line 126 restricts the vacuum applied to the fluid line 124 to provide a controlled drawing of sample from the sample container 118. The sensor 108 is positioned adjacent or about the transfer line 122 to detect a presence or absence of fluid within the transfer line 122. For example, the leading edge of the sample transferred through the transfer line 122 is detected by the sensor 108 and a sense signal is generated accordingly. The sensor system can employ one or more optical sensors, pressure sensors, ultrasonic sensors, or other sensors, and combinations thereof to detect the presence or absence of fluid within the transfer line 122, the fluid line 124, or other portions of the system 100. In implementations, the sensor 108 transmits the sense signal to the controller 116 to indicate presence of the sample within the transfer line 122. The sense signals can be transmitted via wired or wireless communication protocols.

Figure 2B:
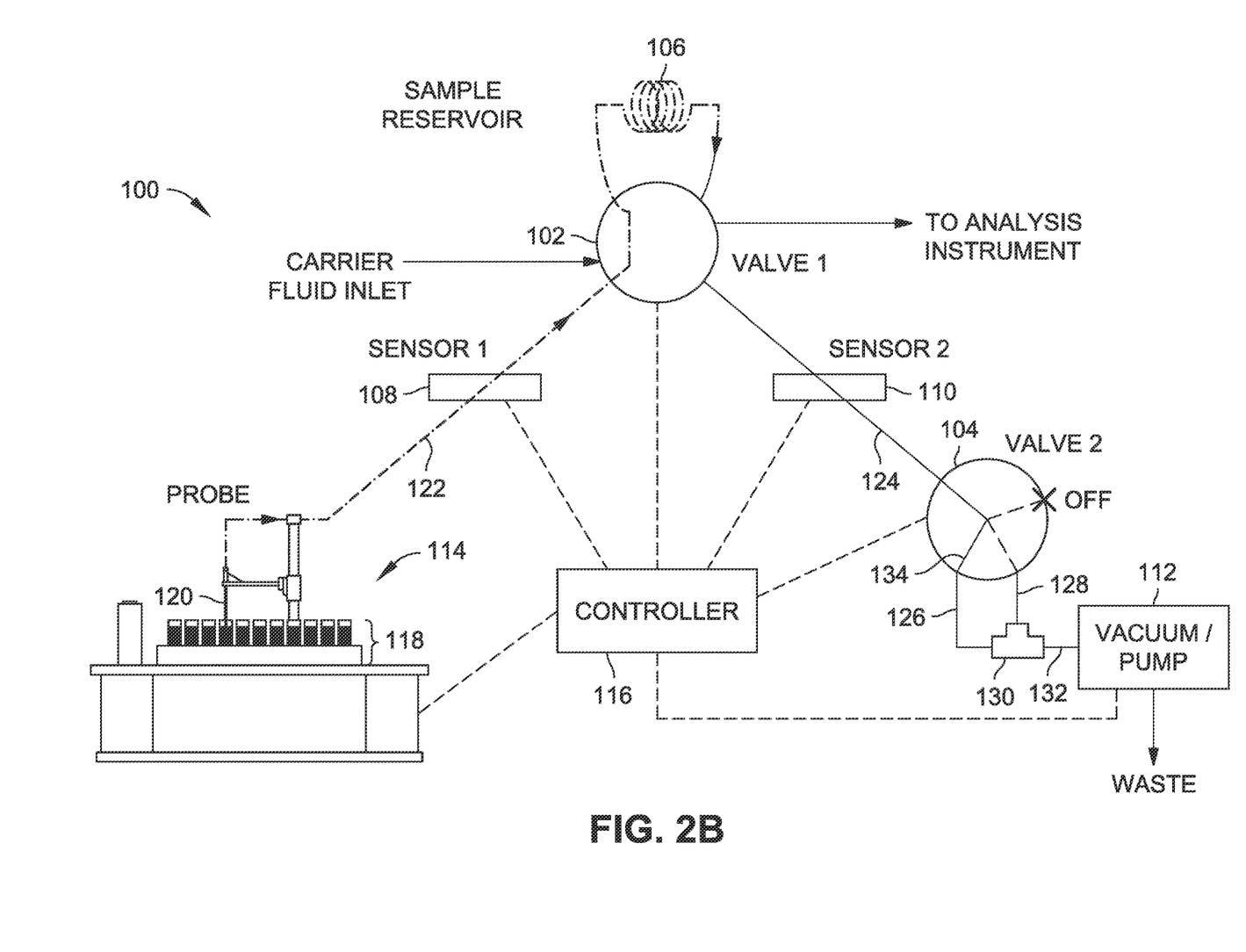
FIG. 2B is a diagrammatic illustration of the system of FIG. 2A with the sample reaching a second sensor of the injection valve.
Figure 2C:
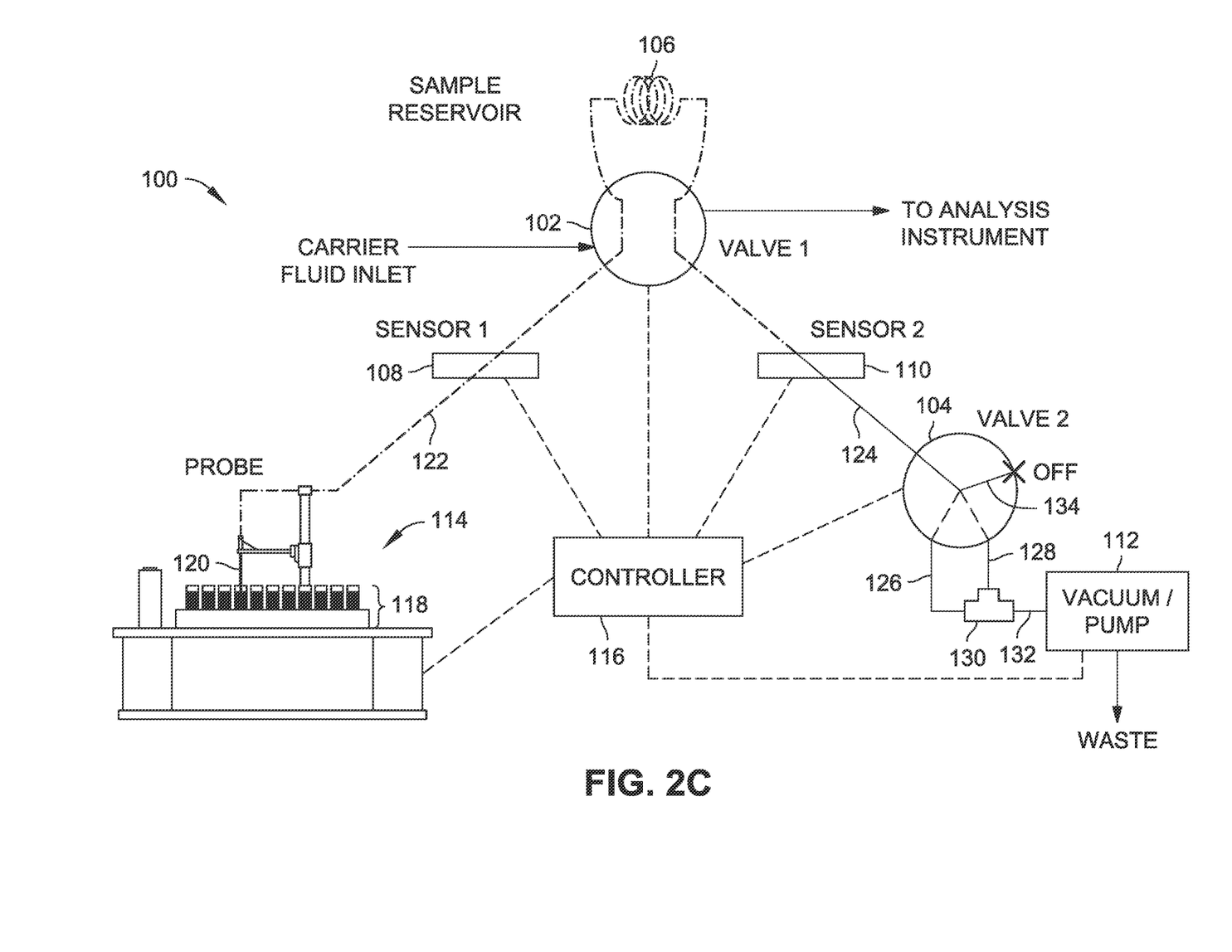
FIG. 2C is a diagrammatic illustration of the system of FIG. 2B with a second valve closing access between a vacuum source and the injection valve to isolate the sample within a sample reservoir.
Figure 3A:
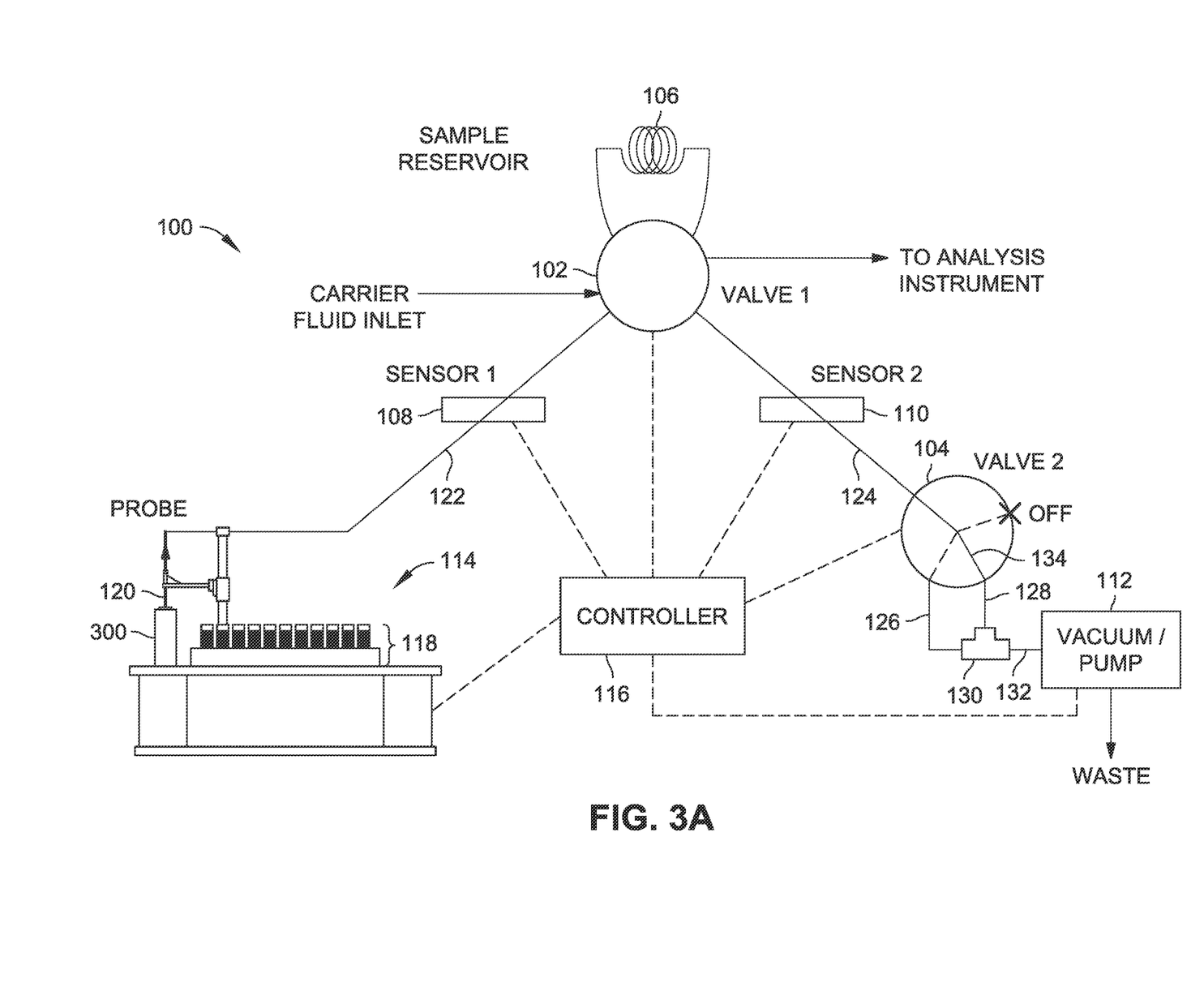
FIG. 3A is a diagrammatic illustration of the system of FIG. 1 with a rinse fluid being drawn through an autosampler probe during analysis of the previously-drawn sample through action of a vacuum in a second vacuum configuration.
Figure 3B:
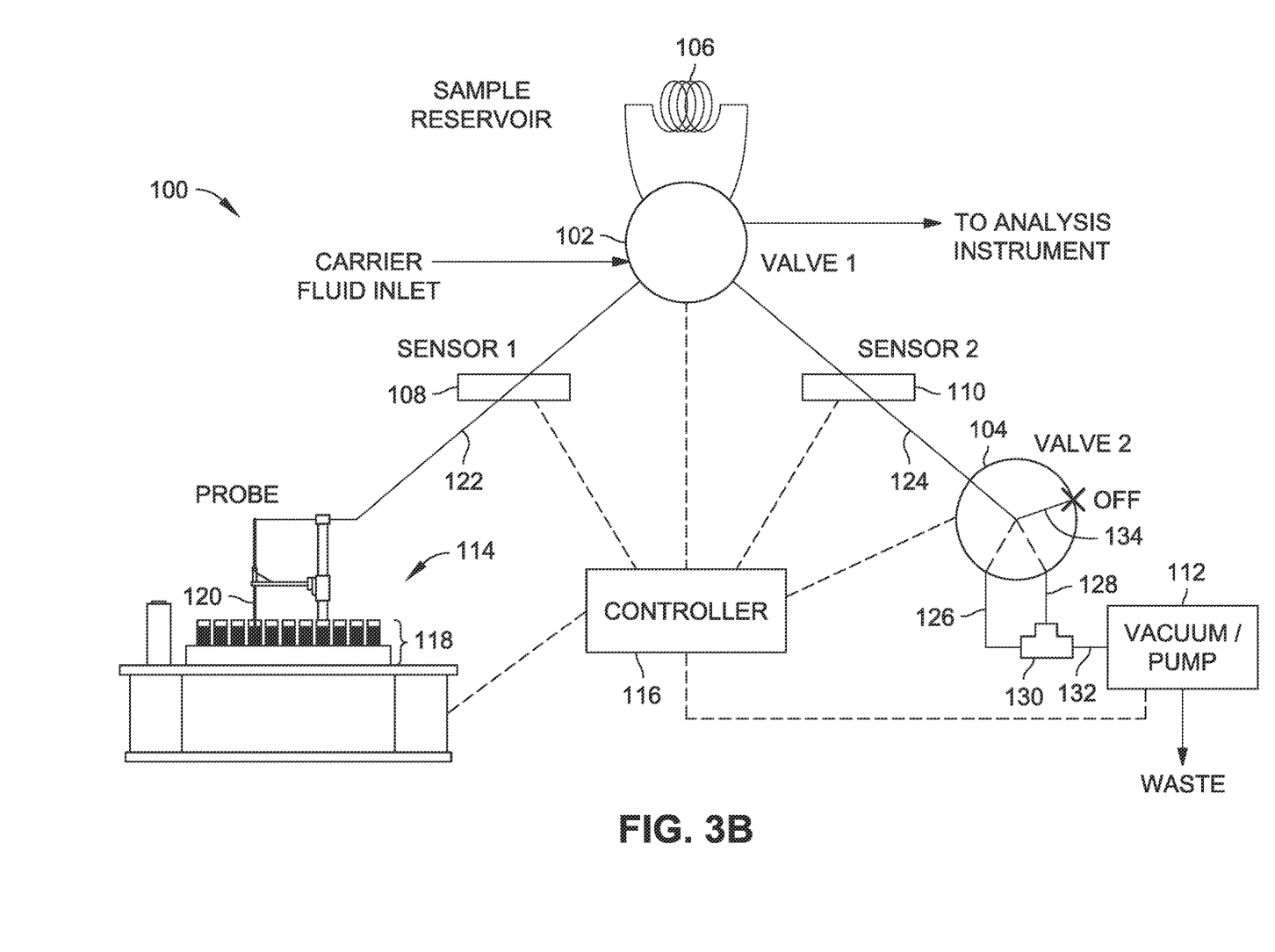
FIG. 3B is a diagrammatic illustration of the system of FIG. 3A with the rinse fluid held in the autosampler probe.

Referring to FIG. 2B, the sample is further drawn through the transfer line 122 and directed into the sample reservoir 106 via the valve 102. Referring to FIG. 2C, the valve 102 further directs the sample into the fluid line 124. The sensor 110 is positioned adjacent or about the fluid line 124 to detect a presence or absence of fluid within the fluid line 124. For example, the leading edge of the sample transferred out of the valve 102 and into the fluid line 124 is detected by the sensor 110 and a sense signal is generated accordingly. In implementations, the sensor 110 transmits the sense signal to the controller 116 to indicate presence of the sample within the fluid line 124. If the sample is exposed to a vacuum that is significantly stronger than that applied via the first vacuum line 126 (e.g., such as a vacuum applied via the second vacuum line 128), the sample could segment within the transfer line 122 causing bubbles or gas pockets between segmented sample portions. The segmented sample may not fully fill the sample reservoir 106 due to the presence of the bubbles or gas pockets, which could lead to erroneous analytical results that depend on the volume of the sample reservoir 106 being fully filled. For instance, analyte concentration calculations can be based on the volume of the sample reservoir 106, where an incomplete fill of the sample reservoir 106 would lead to an erroneous calculation, since no analytes of interest or other liquid would be present in the bubbles or gas pockets.

Referring to FIG. 2C, when the sensor 110 detects the presence of the sample within the fluid line 124, the resulting sense signal causes the controller 116 or other control device to change the flow path configuration of the valve 104 to control or cut off the vacuum applied by the vacuum source 112. The valve 104 can include a rotary valve switchable between positions (e.g., under control by the controller 116, a local controller, or combinations thereof). For example, the valve 104 is transitioned from a first flow configuration (e.g., shown in FIGS. 2A and 2B) to a blocked flow configuration (e.g., shown in FIG. 2C) to stop action of the vacuum source 112 from affecting the sample within the fluid line 124, the sample reservoir 106, or the transfer line 122. When the valve 104 is in the blocked flow configuration, the sample probe 120 no longer draws sample from the sample container 118, since neither the first vacuum line 126 nor the second vacuum line 128 is fluidically coupled to the fluid line 124. Accordingly, the system 100 controls the amount of fluid utilized for a sample or other fluid by trapping fluid at the valve 102 substantially simultaneously with detecting the presence of the fluid with the sensor system. Alternatively or additionally, the controller 116 or other control device controls operation of the autosampler unit 114 to remove the probe 120 from the sample container 118 when the sample or other fluid is detected at the valve 102 by the sensor system. For example, when the probe 120 is removed from the sample container 118, the system 100 prevents additional sample from being introduced to the valve 102, even if the vacuum is still applied to the fluid line 124. If the vacuum is still applied to the fluid line 124 while the probe 120 is removed from the sample container 118, ambient gas instead is introduced to the fluid line 124. In implementations, the valve 104 is omitted from the system 100 when the probe 120 is retracted or otherwise removed from the sample container 118 based on detection of the fluid at the valve 102 by the sensor system.

The system 100 can trap a rinse fluid or another fluid at the valve 102 to facilitate rapid cleaning protocols or other fluid handling protocols between samples introduced into the transfer line 122 and to reduce the amount of rinse liquid needed as compared to traditional sampling procedures. For example, referring to FIGS. 3A and 3E one or more rinse fluids can be transferred through the system 100 during cleaning protocols of the system 100. FIG. 3A shows the system 100 introducing a rinse fluid from a rinse container 300 into the probe 120 through operation of the autosampler unit 114 in fluid communication with the vacuum source 112. The system 100 conforms to the second vacuum configuration by introducing the valve 104 in the second valve configuration to fluidically couple the second vacuum line 128 with the valve 102 (e.g., via fluid line 124), which in turn fluidically couples with the autosampler unit 114 via the transfer line 122. The second vacuum configuration can facilitate rapid transfer of the rinse fluid through the fluid lines and components of the system 100 with flow rates exceeding those facilitated by the first vacuum configuration (e.g., used to transfer sample through the system 100). For instance, the rinse fluid can be permitted to segment during travel through the fluids lines since the precise amount of rinse fluid flowing through the system is not directly related to analyte concentration calculations by the analytical instrument.

The introduction of rinse fluid into the probe 120 can occur during analysis of a previous sample withdrawn by the probe 120 and transferred to the analysis instrument. For example, during analysis a sample, the analysis instrument may be limited in the amount of samples the analysis instrument is available to analyze at a given time (e.g., one at a time, one at a time with one or more others in queue, etc.), so the time required to analyze the sample can be utilized to rinse the system 100 or prepare to rinse. Following introduction of a volume of rinse fluid to the probe 120, and optionally into further downstream portions (e.g., the transfer line 122), the system 100 blocks the vacuum applied to the transfer line 122 (e.g., by switching the valve 104 to the blocked configuration) to trap the rinse fluid within the probe 120. In implementations, the sensor 108 detects the presence of the rinse fluid in the transfer line 122 and triggers the valve 104 to the blocked configuration. Alternatively or additionally, the system 100 utilizes a timer to switch to the blocked configuration after a preset duration of time expires. The autosampler unit 112 then withdraws the probe 120 from the rinse container 300 maintaining the rinse fluid within the probe 120. In implementations, the autosampler unit 112 moves the probe 120 from a position above the rinse container 300 to a position above or in contact with the next sample to be analyzed within the plurality of sample containers 118 (e.g., as shown in FIG. 3B). By prepositioning the probe 120 containing the rinse fluid above or within the next sample to be analyzed, the system 100 saves the transit time required to rinse and move the probe 120 following analysis of the previous sample, allowing the next sample to immediately be drawn into the system 100 after analysis while also rinsing the transfer line 122, the sample reservoir 106, etc. The system 100 can then withdraw the next sample to be analyzed and transfer the sample to the sample reservoir 106 as described herein.

Figure 3C:
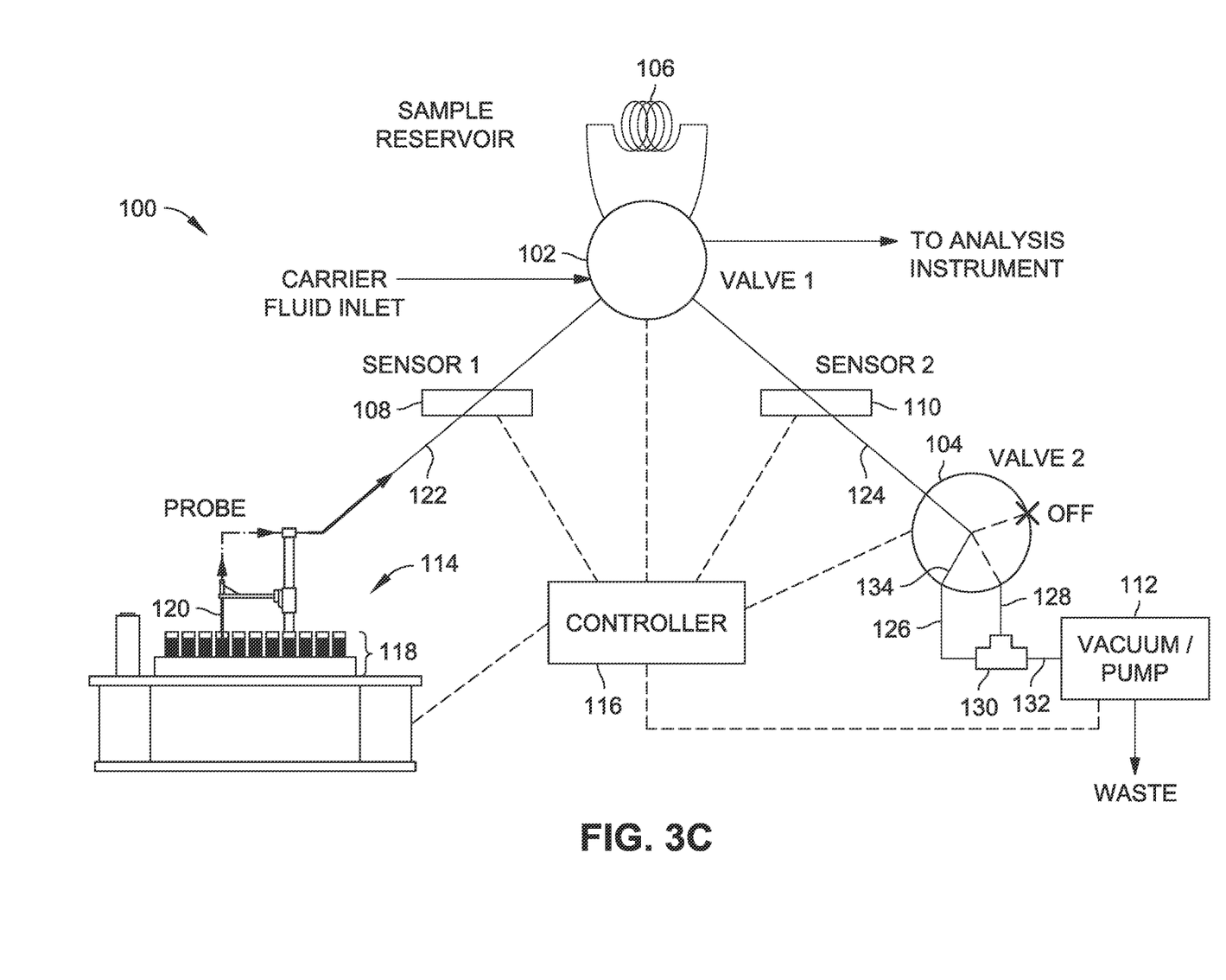
FIG. 3C is a diagrammatic illustration of the system of FIG. 3B with a sample fluid being drawn through the autosampler probe with the rinse fluid and the sample fluid directed toward the injection valve.
Figure 3D:
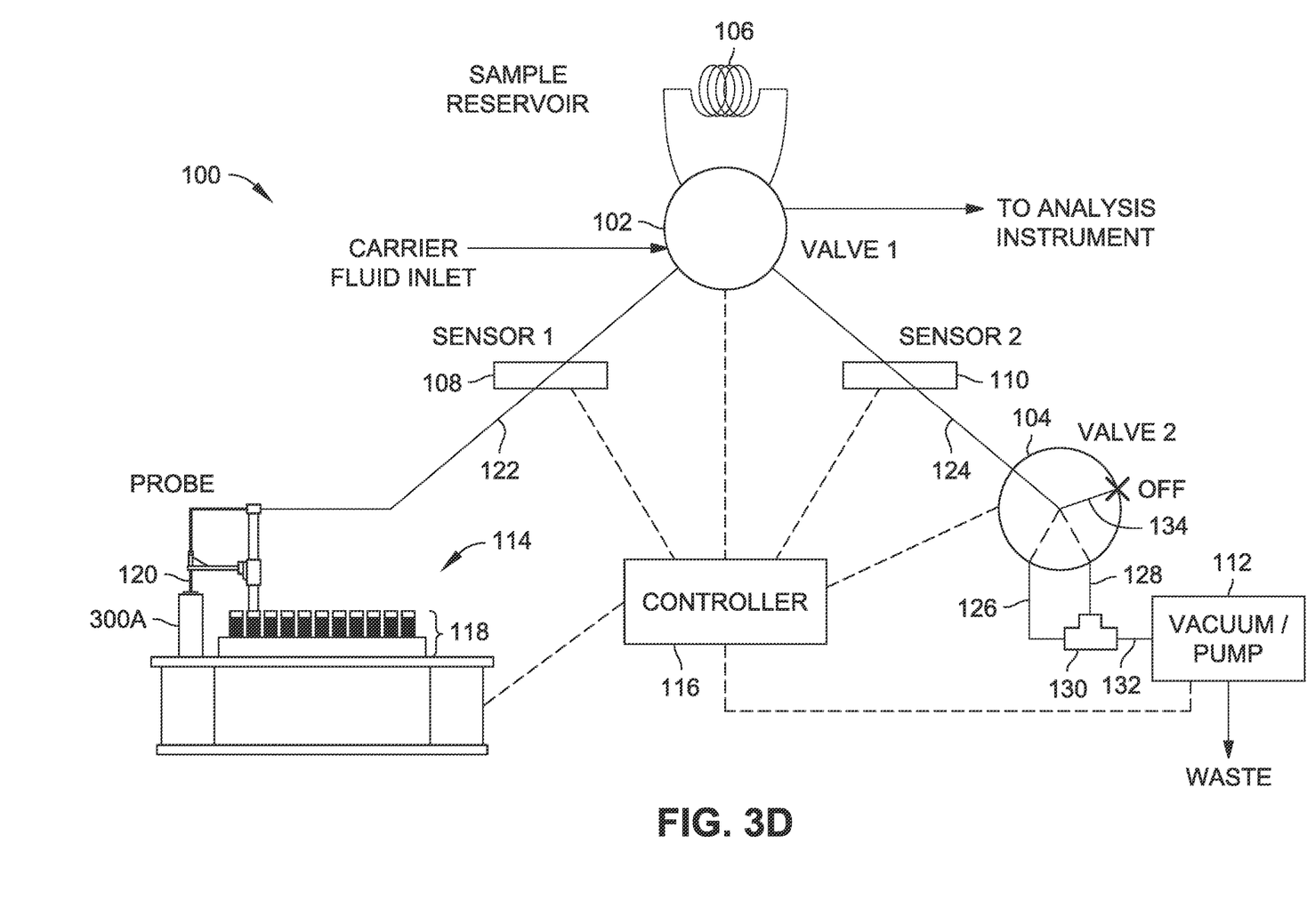
FIG. 3D is a diagrammatic illustration of the system of FIG. 3A with the rinse fluid held in the autosampler probe, with the autosampler probe held above a second rinse fluid container.
Figure 3E:
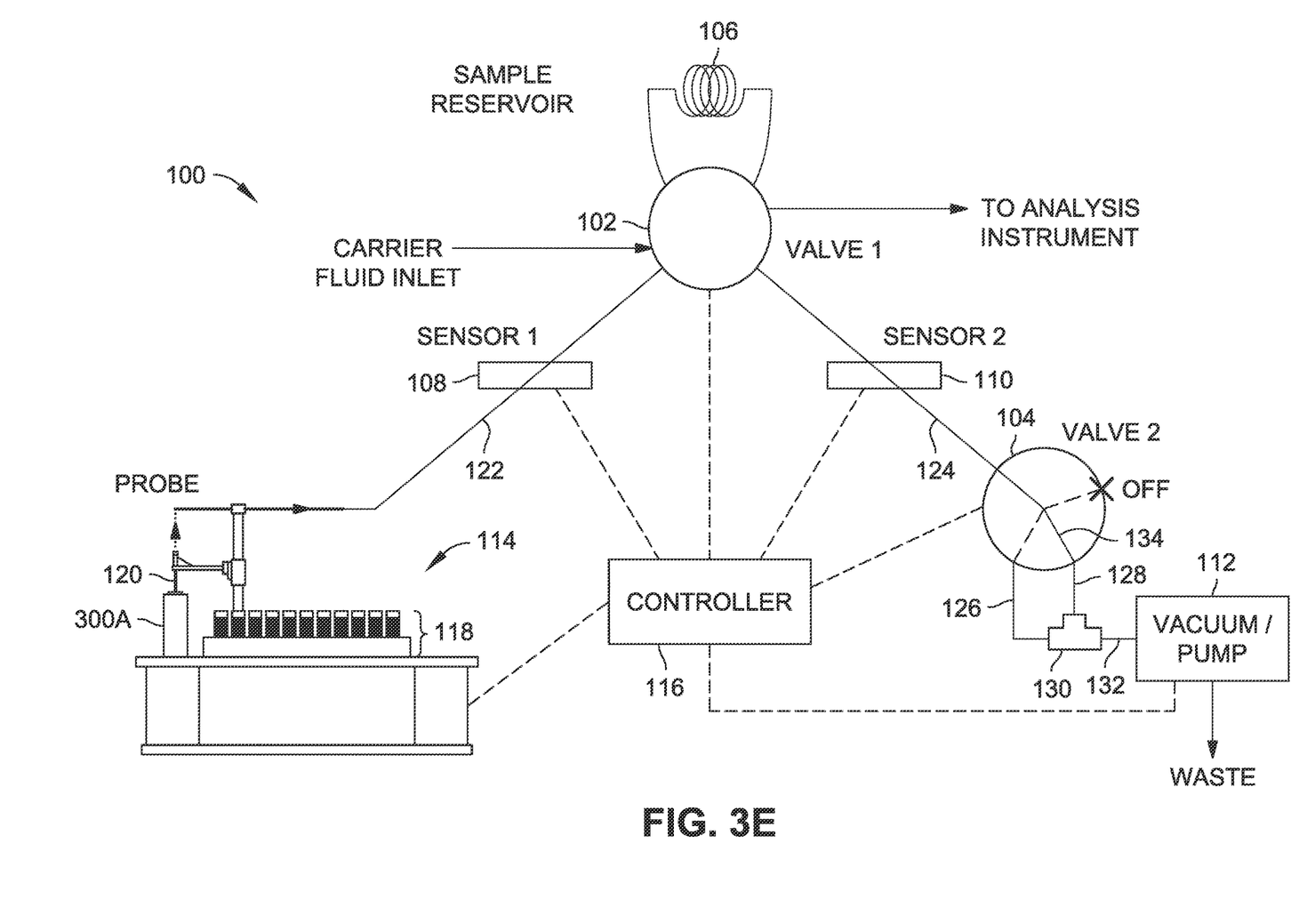
FIG. 3E is a diagrammatic illustration of the system of FIG. 3A with the rinse fluid held in the autosampler probe with a second rinse fluid being drawn through the autosampler probe with the rinse fluid and the second rinse fluid directed toward the injection valve.

The rinse fluid trapped in the probe 120 will precede the sample within the transfer line 122 to rinse the transfer line 122 and other portions of the system 100 prior to passage by the sample (e.g., as shown in FIG. 3C). In implementations, additional rinse fluids can be drawn into the system prior to withdrawal of the next sample for analysis, such as for sample procedures that require multiple rinse fluids (e.g., a first rinse fluid to remove biological components and a second rinse fluid to remove metallic components, a first basic pH rinse fluid and a second acidic pH rinse fluid, a first acidic rinse fluid and a water rinse, etc.). For example, FIG. 3D shows the probe 120 positioned above another rinse container 300A containing a second rinse fluid with the probe 120 containing a first rinse fluid withdrawn from rinse container 300 trapped within the probe 120 (e.g., as described with respect to FIGS. 3A and 3B). The introduction of the first rinse fluid into the probe 120 can occur during analysis of a previous sample withdrawn by the probe 120. The autosampler unit 114 moves the probe 120 above or at the rinse container 300A such that when the analysis of the previous sample is completed (or during or prior thereto), the system 100 can then withdraw the second rinse fluid from the rinse container 300A (e.g., by changing the valve 104 to the second vacuum configuration to permit the vacuum to draw the second rinse fluid into the probe 120 via a stronger vacuum, shown in FIG. 3E). By prepositioning the probe 120 containing the rinse fluid above or within the rinse container 300A during analysis of a sample, the system 100 saves the transit time required to transition between two rinse containers following analysis of the previous sample, allowing two rinse fluids to immediately be drawn into the system 100 after analysis, such as when a subsequent sample is drawn into the probe 120.

The system 100 can also facilitate preventing pre-sampling of a fluid while the probe 120 is introduced to a fluid container (e.g., sample container 118, rinse container 300 or 300A, etc.).

Figure 4:
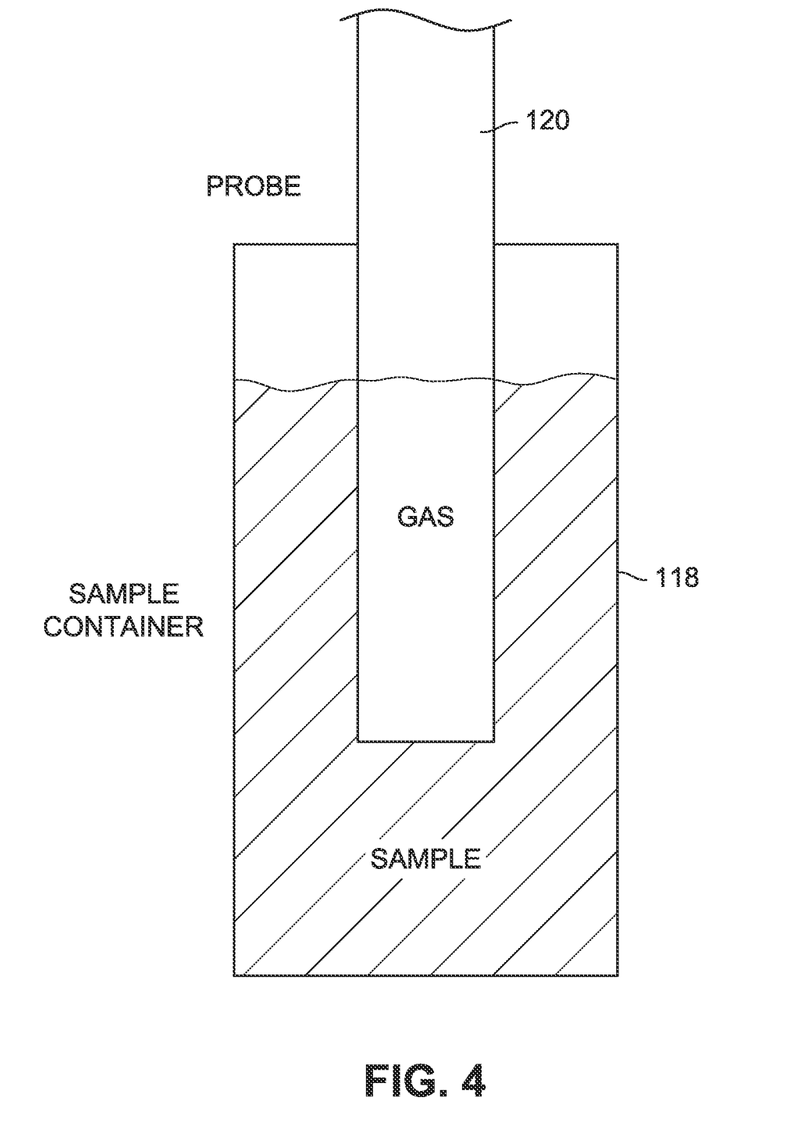
FIG. 4 is a diagrammatic illustration of a sample probe of an autosampler introduced to a sample container containing a sample, where the sample probe is filled with gas.

For example, referring to FIG. 4, the probe 120 is shown introduced to an interior of sample container 118 holding a fluid sample. Prior to introducing the probe 120 to the sample container 118, the system 100 draws gas (e.g., ambient air) into the probe 120, such as through action of the vacuum source 112 in the first vacuum configuration or the second vacuum configuration and then traps the gas within the probe 120, such as by blocking action of the vacuum with the valve 104 in the third valve configuration. The autosampler unit 114 can then introduce the probe 120 to the sample container 118. The gas within the probe 120 prevents the next sample from being drawn into the transfer line 122 until the vacuum source 112 is brought into fluid communication with the probe 120 (e.g., by transitioning the valve 104 to the first valve configuration). This pre-sampling prevention can be utilized, for example, in scenarios where no rinse procedures are utilized between successive samples. Once a sample is drawn into the system 100, the probe 120 can be removed from the sample container 118 to draw and trap air in the probe 120. The autosampler unit 114 can then move to the next sample to be analyzed during analysis of the previous sample and introduce the probe 120 into the next sample container 118. The next sample is then ready for immediate sampling following analysis of the previous sample, preventing the need to transition the probe 120 to the next sample location.

In implementations, the system 100 can reduce the time taken to process a sample in an example sample methodology by an average of about 5 second to about 10 seconds as compared to traditional sample processing procedures. For laboratory facilities handling hundreds of samples, the system 100 can improve throughput on the order of hours in a given day.

The system 100 can automatically manage introduction of samples from the plurality of sample sources 118 to the sample reservoir 106 and subsequently to an analysis instrument through operation of the controller 116, which can be part of a computing device having a processor and memory. The processor provides processing functionality for the computing device and may include any number of processors, micro-controllers, controller 116, or other processing systems, and resident or external memory for storing data and other information accessed or generated by the computing device. The processor may execute one or more software programs that implement the techniques described herein. The processor is not limited by the materials from which it is formed or the processing mechanisms employed therein and, as such, may be implemented via semiconductor (s) and/or transistors (e.g., electronic integrated circuits (ICs)), and so forth.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system comprising:
    a valve system in fluid communication with a sample reservoir and a vacuum source, the valve system having at least a first vacuum configuration to fluidically couple a first vacuum line with the sample reservoir and having a second vacuum configuration to fluidically couple a second vacuum line with the sample reservoir, wherein the first vacuum line and the second vacuum line are fluidically coupled to a same vacuum source;
    a fluid connector fluidically coupled to each of the first vacuum line, the second vacuum line, and the same vacuum source;
    a sensor system configured to detect presence or absence of a fluid handled by the valve system; and
    a controller communicatively coupled with the sensor system and configured to control operation of the valve system to block access of the first vacuum line to the valve system upon detection of the fluid at the valve system to isolate the fluid within the sample reservoir.

2. The system of claim 1, wherein the first vacuum line has an internal cross section that is less than an internal cross section of the second vacuum line.

3. A system comprising:
    a valve system in fluid communication with a sample reservoir and a vacuum source, the valve system having at least a first vacuum configuration to fluidically couple a first vacuum line with the sample reservoir and having a second vacuum configuration to fluidically couple a second vacuum line with the sample reservoir, wherein the valve system includes a valve fluidically coupled to an inlet of the sample reservoir and an outlet of the sample reservoir, and wherein the valve is selectively coupled to the first vacuum line and the second vacuum line via a fluid line;
    a sensor system configured to detect presence or absence of a fluid handled by the valve system; and
    a controller communicatively coupled with the sensor system and configured to control operation of the valve system to block access of the first vacuum line to the valve system upon detection of the fluid at the valve system to isolate the fluid within the sample reservoir.

4. The system of claim 3, wherein the sensor system includes a sensor positioned adjacent the fluid line to detect the presence or absence of the fluid handled by the valve system.

5. The system of claim 3, wherein the valve is configured to be fluidically coupled with a sample probe of an autosampler via a fluid transfer line.

6. The system of claim 5, wherein the sensor system includes a sensor positioned adjacent the fluid transfer line to detect the presence or absence of the fluid handled by the valve system.

7. The system of claim 6, wherein the valve system includes a valve fluidically coupled to an inlet of the sample reservoir and an outlet of the sample reservoir, wherein the valve is selectively coupled to the first vacuum line and the second vacuum line via a fluid line, and wherein the sensor system includes a second sensor positioned adjacent the fluid line to detect the presence or absence of the fluid handled by the valve system subsequent to detection by the sensor positioned adjacent the fluid transfer line.

8. A system comprising:
    a valve system in fluid communication with a sample reservoir and a vacuum source, the valve system having at least a first vacuum configuration to fluidically couple a first vacuum line with the sample reservoir, a second vacuum configuration to fluidically couple a second vacuum line with the sample reservoir, and a third vacuum configuration that blocks fluid communication between the sample reservoir and the first vacuum line and that blocks fluid communication between the sample reservoir and the second vacuum line;

a sensor system configured to detect presence or absence of a fluid handled by the valve system; and a controller communicatively coupled with the sensor system and configured to control operation of the valve system to block access of the first vacuum line to the valve system upon detection of the fluid at the valve system to isolate the fluid within the sample reservoir.

9. A system comprising:

a valve system including a first valve in fluid communication with a sample reservoir and a second valve having at least a first vacuum configuration to fluidically couple a first vacuum line with the first valve and having a second vacuum configuration to fluidically couple a second vacuum line with the first valve;

a sensor system configured to detect presence or absence of a fluid at the first valve; and a controller configured to control operation of the second valve to block access of the first vacuum line to the first valve upon detection of the fluid at the first valve to isolate the fluid within the sample reservoir.

10. The system of claim 9, wherein the first vacuum line has an internal cross section that is less than an internal cross section of the second vacuum line.

11. The system of claim 9, further comprising a fluid transfer line coupled to the first valve and configured to be coupled to a probe of an autosampler.

12. The system of claim 11, wherein the sensor system includes a sensor positioned adjacent the fluid transfer line to detect the presence or absence of the fluid within the fluid transfer line.

13. The system of claim 9, wherein the first valve is fluidically coupled with the second valve via a fluid line.

14. The system of claim 13, wherein the sensor system includes a sensor positioned adjacent the fluid line to detect the presence or absence of the fluid within the fluid line and generate a sense signal in response.

15. The system of claim 14, wherein the controller is communicatively coupled with the sensor to block fluid communication between the first vacuum line and the first valve responsive to receipt of the sense signal indicative of the presence or absence of the fluid within the fluid line.

16. The system of claim 9, wherein the second valve includes a third vacuum configuration that blocks fluid communication between the first valve and the first vacuum line and that blocks fluid communication between the first valve and the second vacuum line.

17. The system of claim 9, further comprising an autosampler having a sample probe configured to be introduced to a sample vessel containing the fluid, the sample probe fluidically coupled with the first valve via a fluid transfer line.

18. The system of claim 17, wherein the autosampler is configured to remove the sample probe from the sample vessel responsive to detection of the presence or absence of the fluid at the first valve.

* * * * *